United States Patent
Mogre et al.

(10) Patent No.: US 9,686,449 B1
(45) Date of Patent: Jun. 20, 2017

(54) METHODS AND SYSTEMS FOR DETECTION OF BLUR ARTIFACT IN DIGITAL VIDEO DUE TO HIGH QUANTIZATION

(71) Applicant: Interra Systems, Inc., Cupertino, CA (US)

(72) Inventors: Advait Madhav Mogre, Sunnyvale, CA (US); Bhupender Kumar, Palwal (IN); Pervez Alam, New Delhi (IN); Rishi Gupta, Noida (IN); Shekhar Madnani, Noida (IN)

(73) Assignee: Interra Systems, Inc., Cupertino, CA (US)

( * ) Notice: Subject to any disclaimer, the term of this patent is extended or adjusted under 35 U.S.C. 154(b) by 0 days.

(21) Appl. No.: 15/075,079

(22) Filed: Mar. 18, 2016

(51) Int. Cl.
*G06K 9/40* (2006.01)
*H04N 5/21* (2006.01)
*H04N 5/208* (2006.01)
*G06T 5/00* (2006.01)

(52) U.S. Cl.
CPC ............ *H04N 5/21* (2013.01); *G06T 5/003* (2013.01); *H04N 5/208* (2013.01); *G06T 2207/10016* (2013.01); *G06T 2207/20201* (2013.01)

(58) Field of Classification Search
None
See application file for complete search history.

(56) References Cited

U.S. PATENT DOCUMENTS

| | | | | |
|---|---|---|---|---|
| 5,293,579 A * | 3/1994 | Stockholm | ............ | G06T 11/203 358/447 |
| 6,608,942 B1 * | 8/2003 | Le | ............ | G06T 5/002 382/199 |
| 6,993,190 B1 * | 1/2006 | Nguyen | ............ | G06K 9/4609 358/519 |
| 7,006,686 B2 * | 2/2006 | Hunter | ............ | H04N 9/045 348/235 |

(Continued)

OTHER PUBLICATIONS

H. Wu, J. H. Phan, A. K. Bhatia, C. A. Cundiff, B. M. Shehata and M. D. Wang, "Detection of blur artifacts in histopathological whole-slide images of endomyocardial biopsies," 2015 37th Annual International Conference of the IEEE Engineering in Medicine and Biology Society (EMBC), Milan, 2015, pp. 727-730.*

(Continued)

*Primary Examiner* — Andrae S Allison
(74) *Attorney, Agent, or Firm* — Next IP Law Group

(57) ABSTRACT

A method and system for determining blur in digital video due to high quantization adopted during encoding of an image. The image is preprocessed to filter the noise and an edge image is extracted from the preprocessed image. A gradient sign change is determined for each pixel of the edge image. A ringing metric is determined based on the gradient magnitude and the gradient sign change. Further, a blockiness metric is determined based on a block grid periodicity and offset that is determined based on block grid analysis of the edge image. Further, a perceptual blurriness metric is determined using a mean and kurtosis computed based on a gradient histogram analysis of the block grid analysed edge (Continued)

image. A composite blurring metric is determined based on the blockiness metric, the perceptual blurriness metric, and ringing metric.

15 Claims, 7 Drawing Sheets

(56) References Cited

U.S. PATENT DOCUMENTS

| | | | | |
|---|---|---|---|---|
| 7,155,067 | B2* | 12/2006 | Jayant | G06T 3/403 |
| | | | | 348/E5.067 |
| 7,609,912 | B2* | 10/2009 | Chae | G06T 3/403 |
| | | | | 382/254 |
| 7,623,704 | B2* | 11/2009 | Sasaki | H04N 1/62 |
| | | | | 345/589 |
| 7,720,301 | B2* | 5/2010 | Zhu | H04N 5/142 |
| | | | | 348/448 |
| 8,965,132 | B2* | 2/2015 | Poyil | G06T 7/0085 |
| | | | | 382/199 |
| 2004/0012675 | A1* | 1/2004 | Caviedes | H04N 17/004 |
| | | | | 348/180 |
| 2006/0078155 | A1* | 4/2006 | Lesellier | H04N 19/865 |
| | | | | 382/100 |
| 2009/0208140 | A1* | 8/2009 | Jayant | G06T 7/0004 |
| | | | | 382/309 |
| 2015/0287172 | A1* | 10/2015 | Choudhury | G06T 5/40 |
| | | | | 382/254 |

OTHER PUBLICATIONS

Kumar, S. Suresh, and DRH Mangalam. "Removal of Different Types of Artifacts and Impulse Noise in Gray Scale Images." Journal of Theoretical and Applied Information Technology 69.2 (2014).*

H. I. Koo, S. H. Lee and N. I. Cho, "A New EDI-based Deinterlacing Algorithm," in IEEE Transactions on Consumer Electronics, vol. 53, No. 4, pp. 1494-1499, Nov. 2007.*

* cited by examiner

METHODS AND SYSTEMS FOR DETECTION OF BLUR ARTIFACT IN DIGITAL VIDEO DUE TO HIGH QUANTIZATION

FIELD OF THE DISCLOSURE

The present disclosure is generally related to determining blur in a video and more particularly to determining blur in digital video due to high quantization adopted during encoding of the image.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Recent advancements in the field of media processing have led to development of various algorithms for detection of compression artifacts in an image. Such techniques for detection of compression artifacts may be spatial domain based or frequency domain based. The compression artifacts may be attributed to various types of lossy compression techniques applied on the image for compression, wherein data is quantized and/or discarded. The artifacts may correspond to ringing, blockiness, and/or the like. The ringing artifacts may result in an appearance of spurious objects near the edges of one or more objects present in the image. The blockiness artifacts may be caused by use of block-based transforms for compression. Such block-based transforms may result in pixelation (macroblocking) in the image when the bit rate is low.

In certain scenarios, the occurrence of artifacts may be attributed to high quantization, e.g. high quantization parameter (QP) used in frequency transform (e.g. DCT) coefficient quantization. A high QP value may lead to an attenuation of high frequency (HF) components of the image in a transform domain. Consequently, due to the high QP value, the probability of HF components being quantized to a programmable threshold may increase, thereby leading to introduction of compression artifacts in the image that may be rendered.

In one of the techniques, a local blur is detected at macroblock edges and a content based weighting scheme is employed to reduce the affect from texture. In accordance with another technique, blocks in the image that are affected by ringing are detected based on a block grid position, location of an object edge and comparison of the local spatial activities of adjacent blocks (affected by artifacts) with those that are not-affected. In accordance with another technique, ringing artifacts in digital images are predicted by determining a number of pixels of a blocks exhibiting luminance exceeding a luminance threshold adequate for detection of a ringing artifact, and a number of such higher luminance pixels that have sufficient contrast with neighbour pixels to be a likely source of a ringing artifact. Other techniques for compression artifacts detection are based on analysis of the edges and adjacent regions in an image that correspond to very low computational complexity.

The existing methods of compression artifact detection are not robust enough as they do not exhaustively explore the combination of various image parameters in detecting the compression artifacts. In order to render high quality media content, it is imperative to minimise the compression artifacts. This in turn, requires robust detection of the various types of compression artifacts and their cause, so as to modify the parameters that lead to compression artifact minimisation.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method and a system for determining blur in a video comprising at least one image, due to high quantization adopted during encoding of the image, is provided. The method comprises preprocessing of the image to filter out the noise. The method further comprises extraction of an edge image by extraction of gradients of the preprocessed image. An edge direction change image may be determined by utilization of the gradient sign change for each pixel. Further, a maximum absolute gradient magnitude may be determined for each row of the edge image based on the pixel values of each pixel in each row of the edge image. A Principal Edge (PE) image may be determined based on a first set of absolute gradients for each row that are greater than a first predefined percentage of the maximum absolute gradient magnitude for that row. Further, a Highly Significant Edge (HSE) image may be determined based on a second set of absolute gradients for each row that are greater than a threshold. This threshold may be equal to the greater of either a programmable constant or a multiple of the first predefined percentage of the aforementioned maximum absolute gradient magnitude that was computed on a row-by-row basis.

The method may further comprise detecting ripples around the set of edge pixels of the determined highly significant edge image, for determining a ringing pixel count and a ringing strength aggregate. The detection of the ripples may be based on detection of variations in pixel levels and gradients in the neighbourhood of edges found in the HSE image. Further, a change of gradient direction in a predefined neighbourhood of the highly significant edge pixel may be detected by utilizing the edge direction change image. The change of gradient direction may be directed in a horizontal and a vertical direction. Further, one or more right overshoots that correspond to one or more right troughs and one or more right crests, may be detected. Similarly, one or more left overshoots that correspond to one or more left troughs and one or more left crests, may be detected. The aggregate of ringing pixel count may be determined by incrementing the current value of the ringing pixel count when one of a first set of conditions or a second set of conditions is true. The first set of conditions and a second set of conditions are based on at least a right crest, a right trough, a left crest and a left trough.

Further, the ringing strength aggregate may be determined by adding the difference between one and a ratio of the difference between corresponding right trough and left trough and the difference between corresponding right crest and left crest. A principal edge thickness aggregate may be determined based on the thickness of each edge present in PE image. Further, a count of principal edge segments is determined by determining total number of edge segments present in the PE image. A ringing metric may be determined based on the ringing pixel count, the ringing strength aggregate, the principal edge thickness aggregate, and the count of the principal edge segments.

The method may further comprise determining a grid periodicity and an offset in horizontal and vertical direction for the edge image. Further, a blockiness metric may be determined based on the validation of a grid in the previous step. A gradient histogram may be generated by using the grid periodicity and the offset in order to only deal with gradients that are off the grid. A mean and kurtosis of the generated histogram may be computed. A perceptual blurriness metric may be determined based on the computed mean and kurtosis. Finally, a composite blurring metric may be determined based on the perceptual blurriness metric, the blockiness metric and the ringing metric.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e. g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
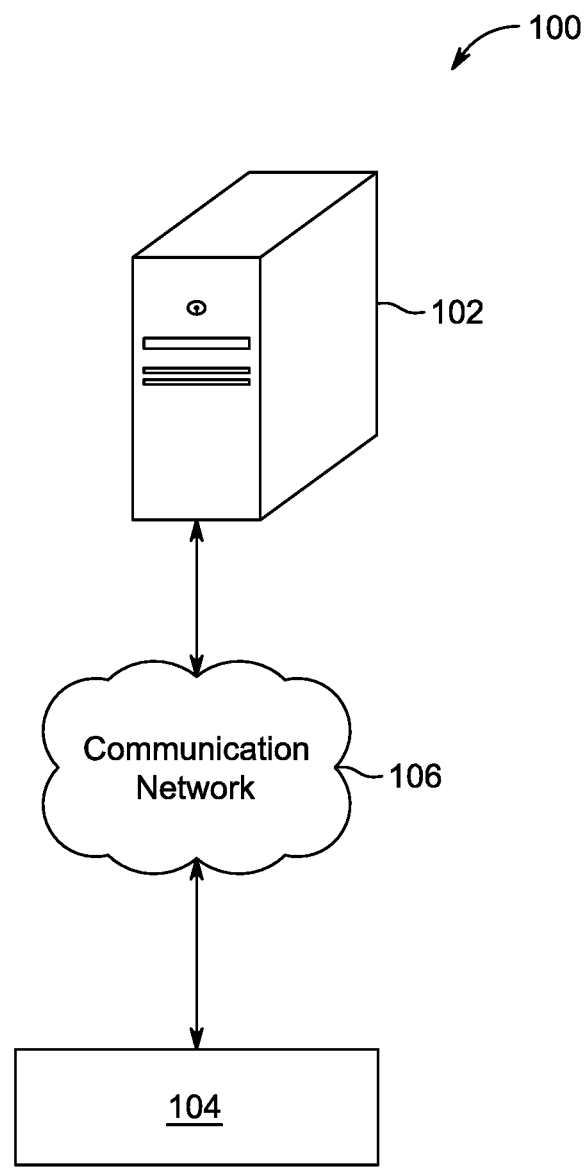
FIG. 1 illustrates a block diagram of a network environment for determination of blur in a video due to high quantization adopted during encoding of the image, according to an embodiment.

FIG. 1 illustrates a block diagram of a network environment for determination of blur in a video due to high quantization adopted during encoding of the image, according to an embodiment. According to an embodiment, video signals may be transmitted from one of the one or more heterogeneous video source 102 that may correspond to a video database, a content server, cloud storage, and/or any other storage means connected to an electronic device 104. In an example embodiment, the video source 102 may be located at a remote location with respect to the electronic device 104. In another example embodiment, the video source 102 may be integrated with the electronic device 104. The electronic device 104 may be connected to the video source 102 by means of a communication network 106, such as a local area network, internet, and/or the like. The electronic device 104 may be operable to receive video that comprise one or more images, from the video source 102 according to the methods described herein. In an aspect, the electronic device 104 may correspond to a television (TV), laptop, desktop, smartphone, or any other apparatus having at least a memory means and a processor. The electronic device 104 may comprise a processor that may be configured to decode the received video content and determine one or more artifacts associated with the video content received from the video source 102. In certain aspects, the video may be stored in a memory means of the electronic device 104 and no external source may be required.

In an example embodiment, the video source 102 may store the video content captured by recording device, such as a camera. The stored video content may be encoded based on one or more encoding schemes. In an example embodiment, the quantization parameter (QP) used for encoding of the video content may correspond to a high value. Consequently, one or more compression artifacts may be visible in the video content when it is rendered on a device, such as the electronic device 104. Such compression artifacts may comprise ringing, blurriness, and/or blockiness artifacts.

In an aspect, the electronic device 104 may receive one or more user inputs from a user (not shown). The received one or more user inputs may correspond to a request to render the video content on a display screen of the electronic device 104. Based on the received one or more user inputs, the electronic device 104 may retrieve the video content from the video source 102, via the communication network 106.

In an aspect, the electronic device 104 may preprocess one or more images of the received video content. The preprocessing may be based on application of a noise reduction technique such as median filtering, and the like, on one or more images of the received video content. The edge detection may be performed on the preprocessed image to generate an edge image. The edge detection may comprise extraction of gradients of the preprocessed image. The extraction of the gradients of the one or more preprocessed images may comprise processing a preprocessed image by a plurality of gradient filter masks. In an example embodiment, the extraction of the gradients of the preprocessed image may be based on one or more techniques known in the art, such as a first order differential of the image, a Sobel Filter based technique for edge detection, Canny edge detection, or the like.

In an aspect, the electronic device 104 may determine a direction of the extracted gradients. Based on the extracted gradient directions, the electronic device 104 may determine a sign change of gradients for each pixel of the edge image. The electronic device 104 may further determine an edge direction change image based on the determined gradient sign change for each pixel.

In an aspect, the electronic device 104 may process the edge image in a row-by-row pattern. For each row of the edge image, the electronic device 104 may determine a maximum absolute gradient magnitude.

In an aspect, the electronic device 104 may determine a principal gradient threshold that may be a first predefined percentage of the maximum absolute gradient magnitude determined for a row of the edge image. The electronic device 104 may compare the absolute gradient values in a row with the determined principal gradient threshold. Based on the comparison, the electronic device 104 may remove the absolute gradient values that are less than the determined principal gradient threshold for the row. Further, the electronic device 104 may retain the absolute gradient values of a row that are greater than the determined principal gradient threshold. The edge image determined based on the aforementioned dynamic thresholding and comparison corresponds to a Principal Edge (PE) image. The absolute gradient values in the PE image may correspond to a first set of absolute gradients. Further, the first set of absolute gradients corresponds to the boundary of one or more objects present in the edge image. The electronic device 104 may perform the aforementioned determination of PE image for horizontal gradients. In an aspect, the electronic device 104 may perform the aforementioned determination of PE image for vertical gradients based on a transpose of the edge image.

In an aspect, the electronic device 104 may determine a highly significant gradient threshold. In an example embodiment, the highly significant gradient threshold is equal to a maximum of a programmable constant, and a multiple of the principal gradient threshold. To detect the presence of ringing artifact in the edge image, the electronic device 104 may determine a second set of absolute gradient values in each row of the image, such that the determined second set of absolute gradient values are greater than the highly significant gradient threshold. Based on the comparison, the electronic device 104 may remove the absolute gradient values that are less than the determined highly significant gradient threshold for the row. Further, the electronic device 104 may retain the absolute gradient values of a row that are greater than the determined highly significant gradient threshold. The edge image determined based on the aforementioned dynamic thresholding and comparison corresponds to a HSE image. The electronic device 104 may perform the aforementioned determination of HSE image for horizontal gradients. In an aspect, the electronic device 104 may perform the aforementioned determination of HSE image for vertical gradients based on a transpose of the edge image.

In an aspect, the electronic device 104 may detect ripples in the edge image that are in the neighbourhood of the locations determined by the set of edge pixels of the determined HSE image. The ringing pixel count and the ringing strength aggregate may be determined based on detection of ringing pixels that are located near the edge pixels within the Highly Significant Edge (HSE) image.

The electronic device 104 may detect a change of gradient direction in a predefined neighbourhood of the highly significant edge pixel. The change of gradient direction is detected by utilizing the determined edge direction change image. The change of gradient direction is detected in a horizontal direction. Similarly, the change of gradient direction is also detected in a vertical direction based on transposing the edge. The detection of the ripples may be further based on the change of gradient direction around one or more edge pixels in the HSE image in one or more predefined directions. The one or more predefined directions may correspond to a vertical direction or a horizontal direction.

In an aspect, the electronic device 104 may detect one or more right overshoots. The one or more right overshoots may further correspond to the one or more right crests or one or more right troughs. The electronic device 104 may determine one or more right overshoots based on the change of gradient direction. The electronic device 104 may determine one or more crests and one or more troughs along the one or more right overshoots based on detection of a change in the gradient direction. Further, the right overshoot is detected as an overshoot on the right side of the highly significant edge pixel and wherein the right crests and the right troughs are the corresponding crests and troughs. Similarly, the electronic device 104 may detect one or more left overshoots. The one or more left overshoots correspond to the one or more left troughs or one or more left crests. The electronic device 104 may determine one or more left overshoots based on the change of gradient direction. The electronic device 104 may determine one or more crests and one or more troughs along the one or more left overshoots based on detection of a change in the gradient direction. Further, the left overshoot is detected as an overshoot on the left side of the highly significant edge pixel and wherein the left crests and the left troughs are the corresponding crests and troughs.

The electronic device 104 may determine the aggregate of ringing pixel count by incrementing the current value of the ringing pixel count when one of a first set of conditions or a second set of conditions are true. In an example embodiment, the first set of conditions and a second set of conditions are based on at least a right crest, a right trough, a left crest and a left trough.

In an example embodiment, the first set of conditions comprise an absolute value of a difference between a right crest and a left crest greater than a programmable threshold, and an absolute value of difference between a right crest and a right trough less than the difference of the right crest and the left crest, and an absolute value of difference between a left crest and a left trough less than the difference of the right crest and the left crest, and either of condition one or condition two. Wherein, condition one comprises of the difference between a left crest and a left trough greater than a programmable threshold, and the difference between a right crest and a right trough less than a programmable threshold, and the determined gradient sign change is a negative value. Condition two comprises of the difference between a left crest and a left trough is less than a programmable threshold, and the difference between a right crest and a right trough is greater than a programmable threshold, and the determined gradient sign change is a positive value.

The electronic device 104 may determine the ringing strength aggregate by adding the difference between one and a ratio of the difference between corresponding right trough and left trough and the difference between corresponding right crest and left crest.

The electronic device 104 may determine a principal edge thickness aggregate. The principal edge thickness aggregate may be determined based on determination of an edge width. In an aspect, the value of the edge width is incremented when a pixel is encountered in the PE image such that the value of the pixel is greater than a programmable threshold. The value of the edge width may further be incremented, till a pixel is encountered in the PE image such that the value of the pixel is less than or equal to a programmable threshold, and the value of a pixel preceding the pixel is greater than a programmable threshold. The segment count will be incremented when the current pixel is less than or equal to a programmable threshold and the previous pixel is greater than a programmable threshold. The number of principal edge segments will be equal to the segment count for the PE image. The electronic device 104 may update the principal edge thickness aggregate based on the determined edge width, if the edge width is greater than or equal to an edge thickness threshold. The electronic device 104 may further determine a count of principal edge segments based on a determination of the total number of edge segments present in the PE image.

In an aspect, the electronic device 104 may determine a ringing metric, based on the ringing pixel count, the ringing strength aggregate, the principal edge thickness aggregate, and the count of principal edge segments.

In an aspect, the electronic device 104 may determine a grid periodicity and an offset for the edge image, in a horizontal and a vertical direction. Based on a validation of the aforementioned grid, the electronic device 104 may determine a blockiness metric. The electronic device 104 may generate a gradient histogram by use of the determined grid periodicity and the offset in order to only consider the gradients that are off the grid. The electronic device 104 may further compute a mean and a kurtosis (fourth moment) of the gradient histogram to determine a perceptual blurriness metric. In an aspect, the electronic device 104 may determine a composite blurring metric based on the determined perceptual blurriness metric, the blockiness metric, and the ringing metric. A person of ordinary skill in the art will appreciate that the determination of the composite blurriness metric may be based on a combination of the determined perceptual blurriness metric, the blockiness metric, and the ringing metric, wherein such a combination may be based on one or more conditions associated with the quality (such as perceptual blur) of the image that is to be rendered on the electronic device 104.

Figure 2:
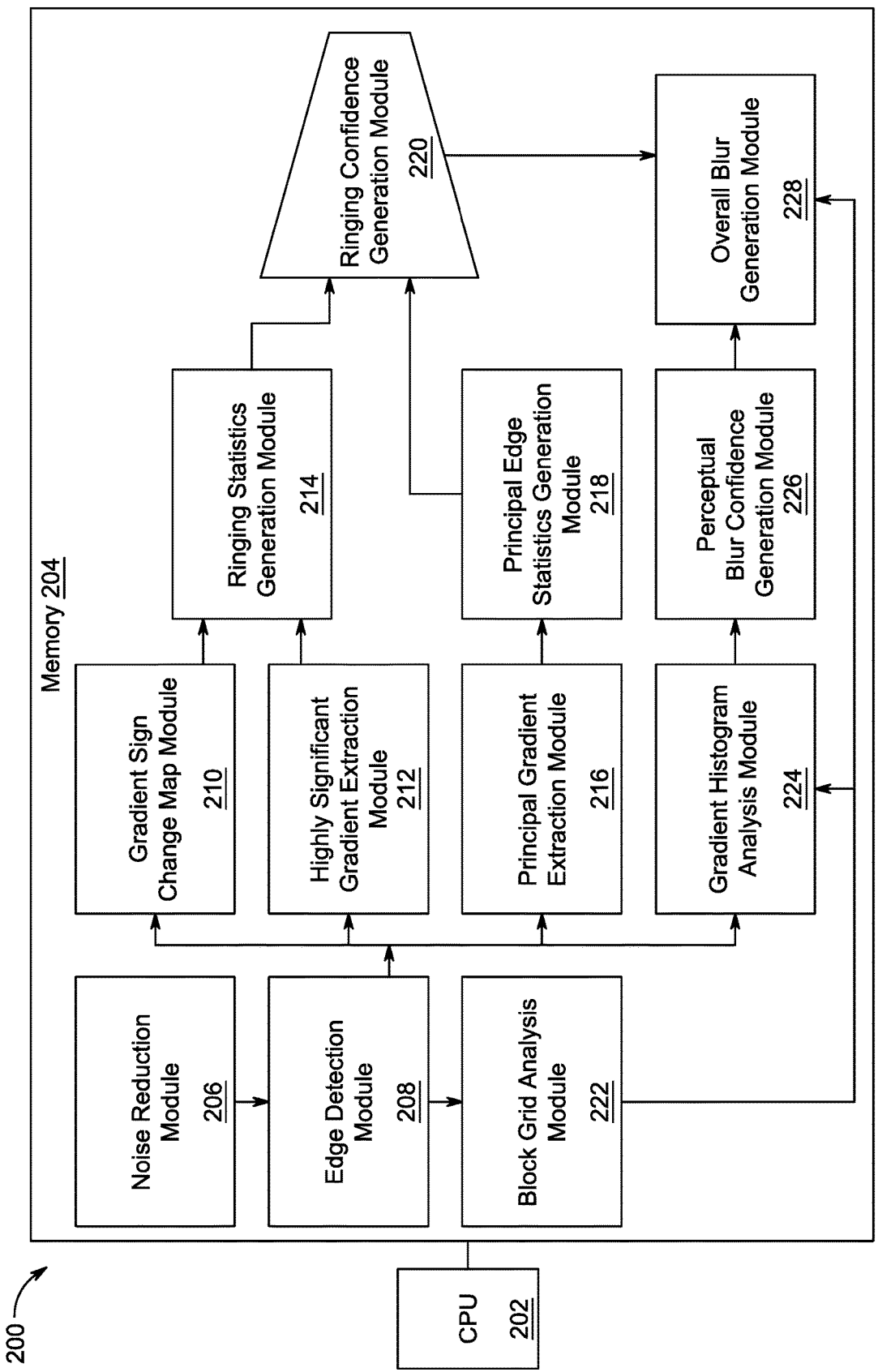
FIG. 2 illustrates is a block diagram of a system for determination of blur in a video due to high quantization adopted during encoding of the image, according to an embodiment.
Figure 3A:
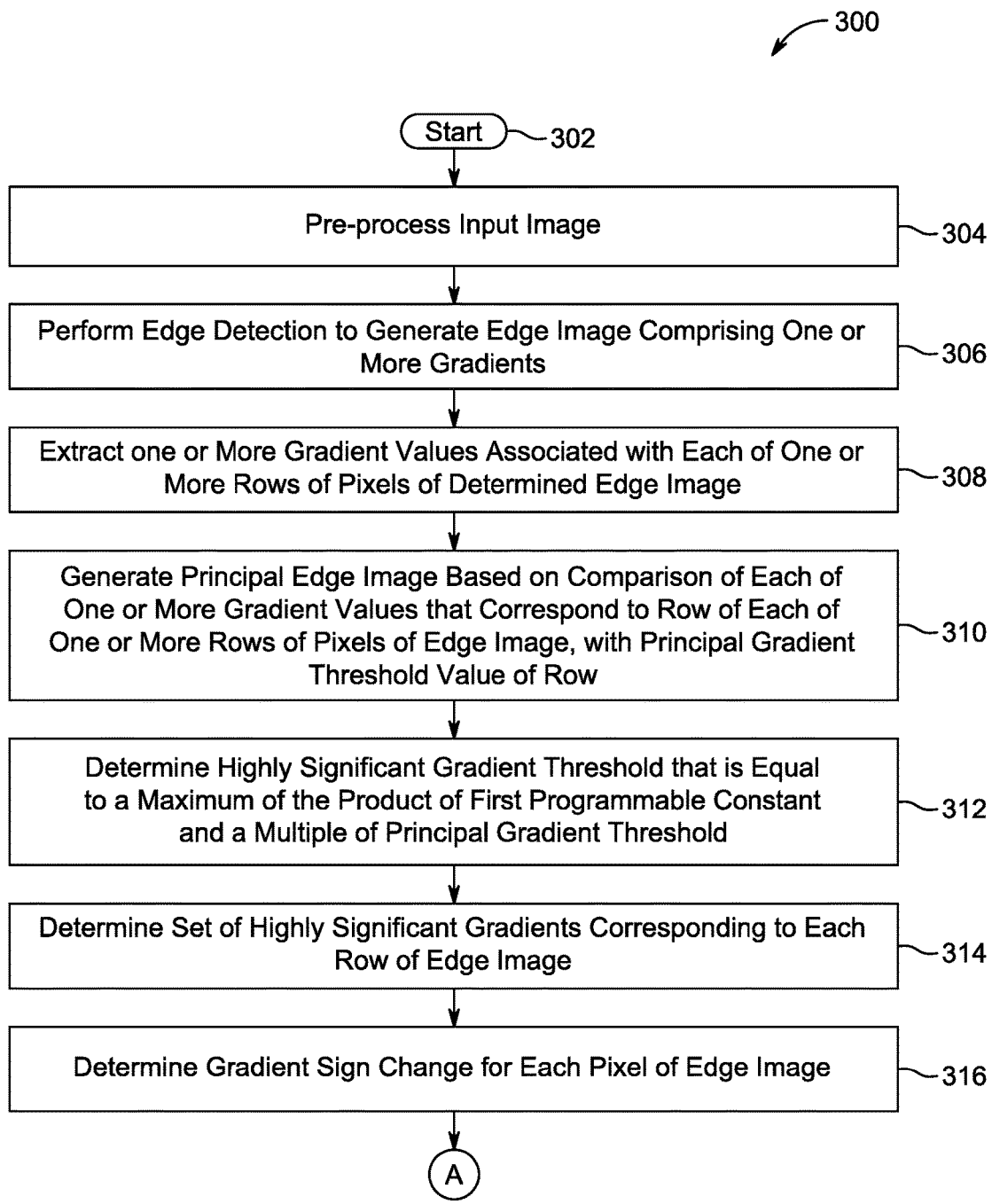
FIGS. 3a, 3b, 3c, and 3d show a flowchart illustrating a method for determination of blur in a video due to high quantization adopted during encoding of the image, according to an embodiment.
Figure 3B:
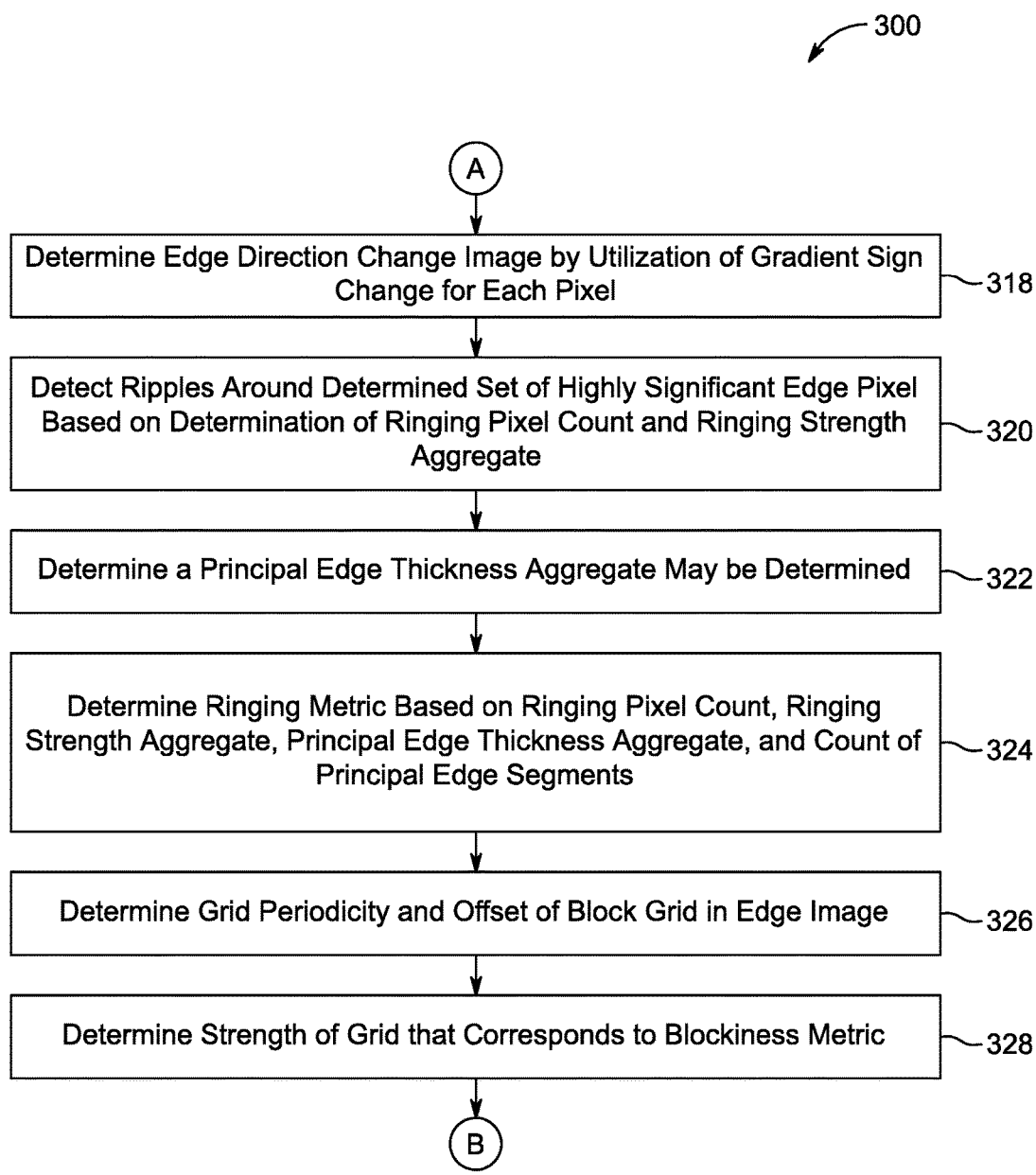
Figure 3C:
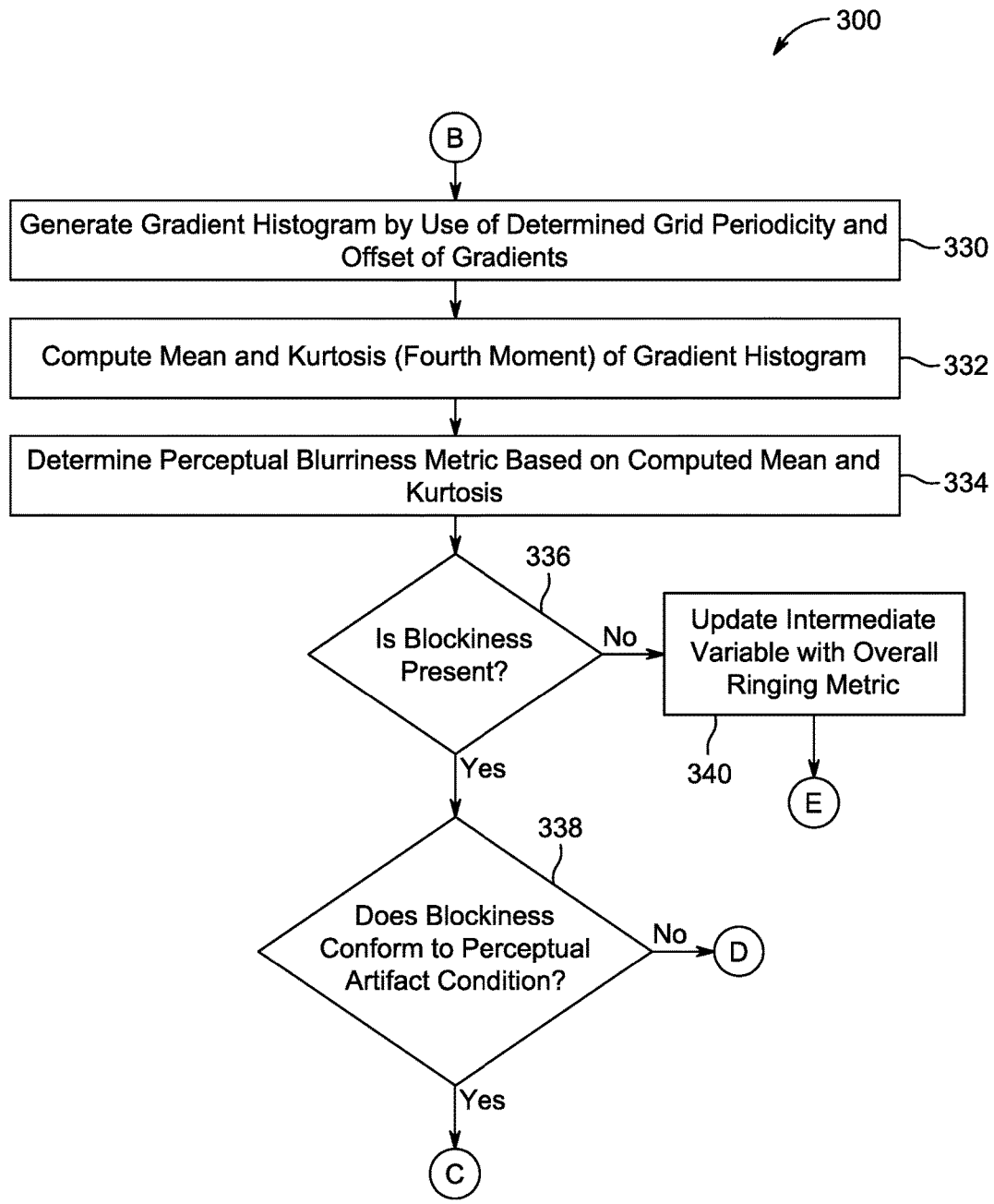
Figure 3D:
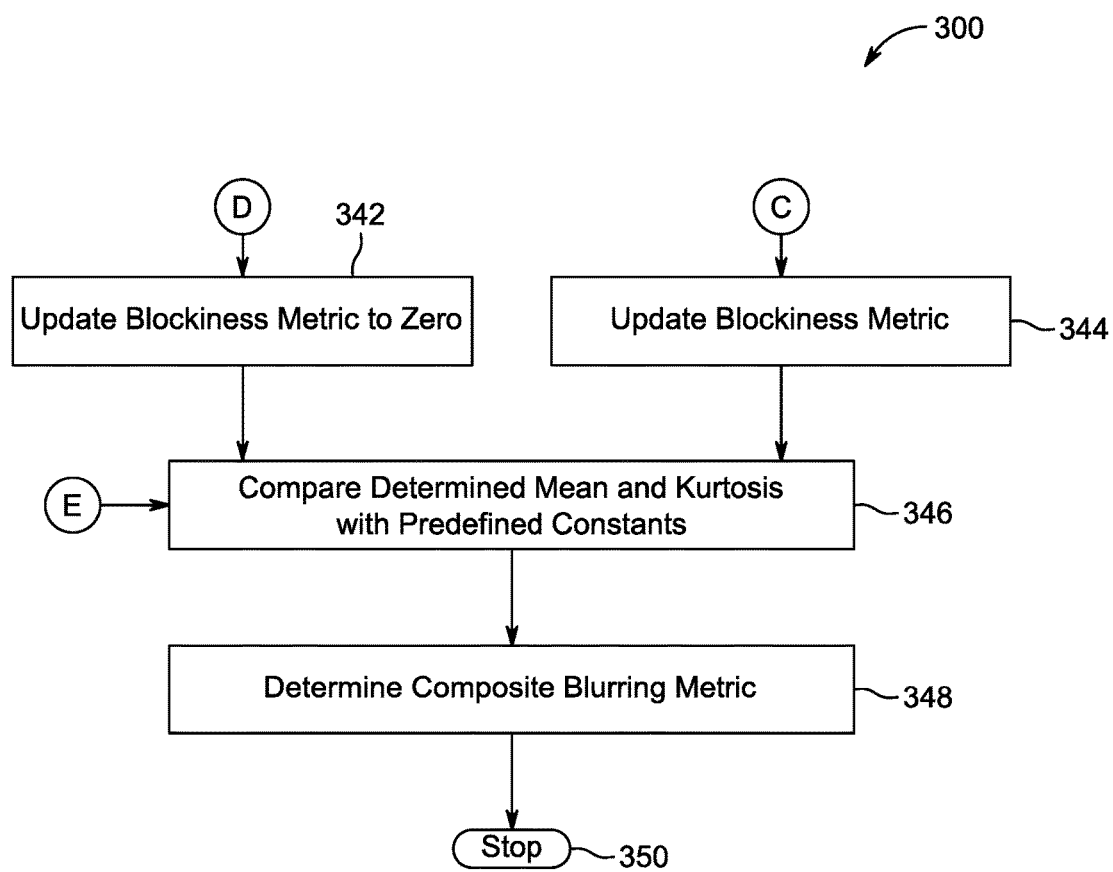

FIG. 2 illustrates is a block diagram of a system for determination of blur in a video due to high quantization adopted during encoding of the image, according to an embodiment. With reference to the region diagram 200, there are shown one or more units of the electronic device 104. FIG. 2 is explained in conjunction with the elements disclosed in FIG. 1. In an implementation, the electronic device 104 may correspond to a laptop, desktop, smartphone, or any other apparatus having at least a central processing unit (CPU) 202 (not shown) and a memory means 204 (not shown). The received video from the video source 102 may be stored in the memory 204 of the electronic device 104 and no external source may be required.

The CPU 202 executes computer program instructions stored in the memory 204. The CPU 202 may also be configured to decode and execute any instructions received from the video source 102 through the communication network 106. The CPU 202 may also execute one or more client applications. The CPU 202 may include one or more general purpose processors (e. g., INTEL microprocessors) and/or one or more special purpose processors (e. g., digital signal processors). The CPU 202 may be configured to execute computer-readable program instructions, such as program instructions to carry out any of the functions described in this description.

The memory 204 includes a computer readable medium including volatile and/or non-volatile storage components, such as optical, magnetic, organic or other memory or disc storage, which may be integrated in whole or in part with a processor, such as CPU 202. Alternatively, the memory may be remotely located and coupled to the CPU 202 by connection mechanism and/or network cable. The memory 204 is enabled to store various types of data. For instance, the memory 204 may store a set of predefined constants related to the electronic device 104 and computer-readable program instructions executable by the CPU 202. In an aspect, the memory 204 may store the video that needs to be analyzed. The memory 204 also includes one or more programming modules that comprise one or more instructions executable by the CPU 202. The memory 204 may comprise one or more modules, such as a noise reduction module 206, an edge detection module 208, a gradient sign change map module 210, a highly significant gradient extraction module 212, a ringing statistics generation module 214, a principal gradient extraction module 216, a principal edge statistics generation module 218, a ringing confidence generation module 220, a block grid analysis module 222, a gradient histogram analysis module 224, a perceptual blur confidence generation module 226, and an Overall blur confidence generation module 228.

A person of ordinary skill in the art will appreciate that each of the modules of the diagram 200 may comprise one or more instruction sets that may be stored in the memory 204 associated with the electronic device 104. The foregoing one or more stored modules may be controlled by the CPU 202 to perform the steps to implement the method to detect blur in a video content caused by high quantization.

In operation, the CPU 202 of the electronic device 104 may receive one or more user inputs from a user to render the video content. Based on the received one or more user inputs the CPU 202 may be configured to retrieve the video content from the video source 102, via the communication network 106. The received video content may comprise one or more compression artifacts caused by the encoding of the digital content by one or more recording devices present at the video source 102. Such one or more compression artifacts may correspond to a blurriness, blockiness and/or ringing artifacts. The received video content may comprise one or more input images. The one or more input images of the received video content may be processed by the CPU 202 based on the steps disclosed in the subsequent disclosure.

In an aspect, the CPU 202 may be configured to preprocess the image based on execution of one or more instructions of the noise reduction module 206. The preprocessing may be based on application of a median filtering technique on one or more images of the received video content. The CPU 202 may be configured to generate an edge image based on detection of edges of the one or more objects of the preprocessed image, by execution of one or more instructions of the edge detection module 208. The edge detection may comprise extraction of gradients of the preprocessed image based on a plurality of gradient filter masks. In an example embodiment, the extraction of the gradients of the preprocessed image may be based on one or more techniques known in the art, such as a first order differential of the image, a Sobel Filter based technique for edge detection, Canny edge detection, or the like.

In an aspect, the CPU 202 may be configured to determine a direction of the extracted gradients based on execution of one or more instructions of the gradient sign change map module 210. Based on the extracted gradient, the CPU 202 may determine a change in sign of pixel value with respect to neighbouring pixel values for each pixel of the edge image. The CPU 202 may further determine an edge direction change image based on the determined sign change of the gradient for each pixel of the edge image.

In an aspect, CPU 202 may be configured to determine a maximum absolute gradient magnitude in each row of the edge image. In an aspect, based on the execution of one or more instructions of the principal gradient extraction module 216, the CPU 202 may be configured to determine a principal gradient threshold. The determined principal gradient threshold may be a first predefined percentage of the maximum absolute gradient magnitude determined for a row of the edge image. CPU 202 may be configured to determine a PE image based on a comparison of the absolute gradient values in a row with the determined principal gradient threshold. The gradient values in the PE image may correspond to a first set of absolute gradients. Further, the first set of absolute gradients corresponds to the boundary of one or more objects present in the edge image. The CPU 202 may be configured to perform the aforementioned determination of the set of gradients values corresponding to horizontal gradients in the PE image, based on execution of one or more instructions of the principal gradient extraction module 216. The CPU 202 may be further configured to perform the aforementioned determination of the set of gradients values corresponding to vertical gradients in the PE image based on a transpose of the edge image that may further be based on execution of one or more instructions of the principal gradient extraction module 216.

In an aspect, the CPU 202 may be configured to determine the presence of ringing artifacts in the edge image. In an example embodiment, such a determination may be based on determination of a highly significant gradient threshold that is equal to a maximum of a programmable constant, and a multiple of the principal gradient threshold. The aforementioned determination of the highly significant gradient may be performed by the CPU 202, based on execution of one or more instructions of the highly significant gradient extraction module 212. The CPU 202 may be configured to determine a set of highly significant gradients corresponding to each row of the edge image, such that the determined set of highly significant gradients are greater than the highly significant gradient threshold. The CPU 202 may be configured to perform the aforementioned determination of the set of highly significant gradients for horizontal gradients, based on execution of one or more instructions of the highly significant gradient extraction module 212. The CPU 202 may be further configured to perform the aforementioned determination of the set of highly significant gradients for vertical gradients based on a transpose of the edge image, based on execution of one or more instructions of the highly significant gradient extraction module 212.

In an aspect, the CPU 202 may be configured to detect ripples around the determined set of highly significant edge pixels based on a determination of a ringing pixel count and a ringing strength aggregate. The CPU 202 may be configured to determine the ringing pixel count and the ringing strength aggregate based on execution of one or more instructions of the ringing statistics generation module 214.

The CPU 202 may be configured to determine ringing pixel count and the ringing strength aggregate, based on detection of pixels that are located near the edges in the HSE image. The CPU 202 may be configured to execute one or more instructions of the ringing statistics generation module 214 to detect a change of gradient direction in a predefined neighbourhood of the highly significant edge pixel. The CPU 202 may be configured to detect change of gradient direction by utilizing the determined edge direction change image. The CPU 202 may be further configured to detect change of gradient direction in a horizontal direction and a vertical direction based on transposing the edge image and performing the aforementioned steps to detect ripples. The detection of the ripples, by the CPU 202, may be further based on the determination of change of the gradient direction around one or more edges in the HSE image in one or more predefined directions. The one or more predefined directions may correspond to a vertical direction or a horizontal direction.

The CPU 202 may be configured to detect one or more right overshoots. The one or more right overshoots may correspond to the one or more right crests or one or more right troughs. The CPU 202 may be further configured to determine one or more right overshoots based on the change of gradient direction around the edge pixels in the HSE image. The CPU 202 may be configured to determine one or more crests and one or more troughs along the one or more right overshoots based on detection of a change in the gradient direction. Further, the right overshoot is detected as an overshoot on the right side of the highly significant edge pixel and wherein the right crests and the right troughs are the corresponding crests and troughs. Similarly, the CPU 202 may be configured to detect one or more left overshoots. The one or more left overshoots correspond to the one or more left crests and one or more left troughs. The CPU 202 may be configured to determine one or more left overshoots based on the change of gradient direction around the edge pixels in the HSE image. The CPU 202 may be configured to determine one or more crests and one or more troughs along the one or more left overshoots based on detection of a change in the gradient direction. Further, the left overshoot is detected as an overshoot on the left side of the highly significant edge pixel and wherein the left crests and the left troughs are the corresponding crests and troughs. In an example embodiment, the aforementioned steps may be performed by the CPU 202 based on execution of one or more instructions of the ringing statistics generation module 214. A person of ordinary skill in the art will appreciate that the aforementioned steps may be performed by the CPU 202 based on one or more other modules stored in the memory 204.

The CPU 202 may be configured to determine the aggregate of ringing pixel count by incrementing the current value of the ringing pixel count when one of a first set of conditions or a second set of conditions are true. In an example embodiment, the first set of conditions and a second set of conditions are based on at least a right crest, a right trough, a left crest and a left trough. The determination of the aggregate of ringing pixel count may be performed by the CPU 202 based on execution of one or more instructions of the ringing statistics generation module 214.

In an example embodiment, the first set of conditions comprise conditions, wherein an absolute value of a difference between a right crest and a left crest greater than a programmable threshold, an absolute value of difference between a right crest and a right trough less than the difference of the right crest and the left crest, an absolute difference between a left crest and a left trough less than the difference of the right crest and the left crest, either of condition one or condition two. Wherein, condition one comprises of the difference between a left crest and a left trough greater than a programmable threshold, the difference between a right crest and a right trough less than a programmable threshold, and the determined gradient sign change is a negative value. The condition two comprises of the difference between a left crest and a left trough is less than a programmable threshold, and the difference between a right crest and a right trough is greater than a programmable threshold, and the determined gradient sign change is a positive value.

The CPU 202 may be configured to determine the ringing strength aggregate by adding the difference between one and a ratio of the difference between corresponding right trough and left trough and the difference between corresponding right crest and left crest. The determination of the ringing strength aggregate may be performed based on execution of one or more instructions of the ringing statistics generation module 214.

In an aspect, the CPU 202 may be configured to determine a principal edge thickness aggregate, based on execution of one or more instructions of the principal edge statistics generation module 218. The principal edge thickness aggregate may be determined based on determination of an edge width. The value of the edge width is incremented when a pixel is encountered in the PE image such that the value of the pixel is greater than a programmable threshold. The value of the thickness count may further be incremented till a pixel is encountered in the PE image such that the value of the pixel is less than or equal to a programmable threshold, and the value of a pixel preceding the pixel is greater than a programmable threshold. The segment count will be incremented when the current pixel is less than or equal to programmable threshold and the previous pixel is greater than programmable threshold. The number of principal edge segments will be equal to the segment count for the PE image. The CPU 202 may be configured to update the principal edge thickness aggregate based on the determined edge width, if the edge width is greater than or equal to an edge thickness threshold.

In an aspect, the CPU 202 may be configured to determine a count of principal edge segments based on a determination of the total number of edge segments present in the PE image. The determination of the count of principal edge segments may be based on the execution of one or more instructions of the principal edge statistics generation module 218. In an example embodiment, the CPU 202 may be further configured to determine a ringing metric, based on the ringing pixel count, the ringing strength aggregate, the principal edge thickness aggregate, and the count of principal edge segments. The ringing metric may be determined by the CPU 202 based on the execution of one or more instructions of the ringing confidence generation module 220.

In an aspect, the CPU 202 may be configured to determine a grid periodicity and an offset for the edge image, in a horizontal and a vertical direction, based on execution of one or more instructions of the block grid analysis module 222. Based on a validation of the aforementioned grid, by execution of one or more instructions of the block grid analysis module 222, the CPU 202 may be configured to determine a blockiness metric. The CPU 202 may be configured to generate a gradient histogram by use of the determined grid periodicity and the offset of the gradients that are off the grid. Such a gradient histogram may be may be generated based on a binning technique known in the art, by execution of one or more instructions of the gradient histogram analysis module 224 by the CPU 202. The CPU 202 may be configured to compute a mean and a kurtosis (fourth moment) of the gradient histogram to determine a perceptual blurriness metric. The perceptual blurriness metric may be determined based on execution of one or more instructions of the perceptual blur confidence generation module 226 by the CPU 202.

The CPU 202 may be configured to determine a composite blurring metric based on the determined perceptual blurriness metric, the determined blockiness metric, and the determined ringing metric. Such a composite blurring metric may correspond to a perceptual blur that is indicative of the blur that is perceived by a human eye. The generation of the composite blurring metric may be based on the one or more conditions associated with the determined perceptual blurriness metric, the determined blockiness metric, and the determined ringing metric, as discussed in FIGS. 3 and 4. The composite blurring metric may be determined based on execution of one or more instructions of the Overall blur confidence generation module 228 by the CPU 202.

FIGS. 3a, 3b, 3c, and 3d show a flowchart illustrating a method for determination of blur in a video due to high quantization adopted during encoding of the image, according to an embodiment. FIGS. 3a, 3b, 3c, and 3d comprise a flowchart 300 that is explained in conjunction with the elements disclosed in FIGS. 1, 2, and 4.

The flowchart of FIGS. 3a, 3b, 3c, and 3d shows the architecture, functionality, and operation for determination of blur in a video due to high quantization adopted during encoding of the image. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIGS. 3a, 3b, 3c, and 3d may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart starts at the step 302 and proceeds to step 304.

At step 304, the input image may be preprocessed for reduction of speckled and/or shot noise. Such a preprocessing is performed by the CPU 202, based on execution of one or more instructions of the noise reduction module 206. In an example embodiment, the preprocessing may be based on an image processing technique, such as median filtering. The CPU 202 may be configured to perform the median filtering based on execution of one or more instruction of the noise reduction module 206. The one or more instructions of the noise reduction module 206 may isolate a "noise pixel" in the input image that may be surrounded by a "normal pixel" in the vicinity of the "noise pixel". The "noise pixel" corresponds to a pixel value that may not be in consonance with one or more pixels in the vicinity. Therefore, a nearest-neighborhood (NN) analysis may performed by constructing an "N×N" window (where "N" is typically odd). The window is moved over the "Y" (luminance component) image, one pixel location at a time—horizontally, beginning from the upper left hand corner of the input image, all the way to the lower right hand corner, in a raster fashion. At each location the center of the "N×N" window may be the reference pixel that is analyzed for noise. The contents of the "N×N" pixels captured within the window may be ranked from a lowest to a highest in a linear array of length "N*N". Subsequently, the reference pixel value may be replaced by the value in median location of the linear array, such as location "(N*N−1)/2". Thus, if the reference pixel is noisy, then it would be ranked very high in the linear array and thus would be far away or isolated from the median location. This step generates a "preprocessed_image".

At step 306 edge detection may be performed by the CPU 202 to generate an edge image comprising of one or more gradients. The edge detection may be performed based on execution of one or more instructions of the edge detection module 208 by the CPU 202. The one or more instructions may be based on one or more edge detection techniques (known in the art), such as a Sobel operator, a first order difference, Canny edge detection, or the like.

In an aspect, the Sobel operator based technique, may be based on Sobel masks, such as "sobel_mask_h" and "sobel_mask_v" that may be correspond to a "3×3 matrix" in accordance with the equations (1) and (2):

$$\text{sobel\_mask\_h} = \begin{bmatrix} -1 & 0 & 1 \\ -2 & 0 & 2 \\ -1 & 0 & 1 \end{bmatrix} \quad (1)$$

$$\text{sobel\_mask\_v} = \begin{bmatrix} 1 & 2 & 1 \\ 0 & 0 & 0 \\ -1 & -2 & -1 \end{bmatrix} \quad (2)$$

Based on the masking of the "filtered_image_array" by use of the Sobel mask "sobel_mask_h" in a raster fashion, a horizontal gradient profile may be generated. Similarly, based on the masking of the "filtered_image_array" by use of the Sobel mask "sobel_mask_v" in a raster fashion, a vertical gradient profile may be generated. At each location a pair of horizontal and vertical gradient values "{grad_x, grad_y}", respectively, may be used to generate an overall absolute gradient magnitude "grad_mag" and direction "grad_ang", in accordance with the equations (3) and (4):

$$\text{grad\_mag} = \sqrt{(\text{grad\_x})^2 + (\text{grad\_y})^2} \quad (3)$$

$$\text{grad\_ang} = \tan^{-1}(\text{grad\_y}/\text{grad\_x}) \quad (4)$$

In an aspect, the first order difference based technique may be used. The first order difference may be based on masks, such as "first_diff_h" and "first_diff_v" that may be correspond a "3×3 matrix" in accordance with the equations (5) and (6)

$$\text{first\_diff\_h} = [-1 \ 1] \quad (5)$$

$$\text{first\_diff\_v} = \begin{bmatrix} -1 \\ 1 \end{bmatrix} \quad (6)$$

At step 308, one or more gradient values associated with each of the one or more rows of pixels of the determined edge image may be extracted, by the CPU 202. The determined gradient value corresponds to a predefined programmable percentage of maximum absolute gradient magnitude for each row in the edge image. The extraction of the gradient value by the CPU 202 may be based on the one or more instructions of the principal gradient extraction module 216. The extraction of the gradient value may be performed to separate or core out the noisy gradients from pixels that correspond to one or more objects present in the edge image.

In an aspect, a max gradient "max_grad" for each row may be obtained by the CPU 202 by use of the pair of horizontal and vertical gradient values "{grad_x, grad_y}".

The maximum value obtained for each row of the edge image may be used to implement a gradient value "BOUNDARY_CORE[x]" for that row, where "x" is the row index. In an aspect, a proportion of the "max_grad" may be used to generate the gradient value "BOUNDARY_CORE[x]" in accordance with equation (7):

$$\text{BOUNDARY\_CORE}[x] = \text{B\_SCALE} * (\text{max\_grad}/\text{EB\_K1}) \quad (7)$$

where, "EB_K1" is the programmable factor used earlier and "B_SCALE" is the scaling factor that may correspond to a programmable parameter that may further corresponds to the set of predefined constants stored in the memory 204. The aforementioned BOUNDARY_CORE[x] now corresponds to principal gradient threshold. A person of ordinary skill in the art will appreciate that the predefined constant "EB_K1" and the scaling factor "B_SCALE" be may stored in the memory 204 or provided by the user in real-time, without limiting the scope of the disclosure.

At step 310, a PE image may be generated based on a comparison of each of the one or more gradient in the edge image, with the principal gradient threshold of the row. For example, the overall absolute gradient magnitude "grad_mag[x][y]" for a row index "x" and column index "y", may be compared with the gradient value "BOUNDARY_CORE[x]". In instances, when the value of the overall absolute gradient magnitude "grad_mag[x][y]" exceeds the gradient value "BOUNDARY_CORE[x]", corresponding element in the array "boundary_image_array[x][y]" having row index "x" and column index "y" is updated with the overall absolute gradient magnitude "grad_mag[x][y]". Such gradients exceeding the gradient value correspond to a first set of absolute gradients. In instances, when the value of the overall absolute gradient magnitude "grad_mag[x][y]" is less than the gradient value "BOUNDARY_CORE[x]", corresponding element in the array "boundary_image_array[x][y]" having row index "x" and column index "y" is updated with a value "0". The array "boundary_image_array" corresponds to the PE image.

At step 312, a highly significant gradient threshold that is equal to a maximum of a first programmable constant and a multiple of principal gradient threshold, may be determined by the CPU 202. In an aspect, the highly significant gradient threshold may be determined to detect the presence of ringing artifact in the edge image. Such a determination of the highly significant gradient threshold may be based on execution of one or more instructions of the highly significant gradient extraction module 212. The row based highly significant gradient threshold may correspond to "EB_SIG_GRAD_THR_D[x]" that may be determined in accordance with the equation (8):

$$EB\_SIG\_GRAD\_THR\_D[x] = \max\{(EB\_SIG\_GRAD\_THR), (EB\_K49*BOUNDARY\_CORE[x])\} \quad (8)$$

where, "EB_SIG_GRAD_THR" corresponds to the first programmable constant, "EB_K49" corresponds to the second programmable constant, and "BOUNDARY_CORE" corresponds to the principal gradient threshold. In an aspect, the first programmable constant, the second programmable constant, may correspond to the set of predefined constants stored in the memory 204.

At step 314, a set of highly significant gradients corresponding to each row of the edge image, may be determined by the CPU 202. The determined set of highly significant gradients corresponds to gradients which exceed EB_SIG_GRAD_THR_D[x], around which the CPU 202 may detect ringing artifact. In an aspect, the set of highly significant gradients may be determined based on a comparison of element in the array "grad_image_array[x][y]", with the determined highly significant gradient threshold "EB_SIG_GRAD_THR_D[x]". The determined set of highly significant gradients may be updated in the array "sig_grad_array" that comprises of gradients that are greater than the highly significant gradient threshold. The CPU 202 may be configured to perform the aforementioned determination of the set of highly significant gradients for horizontal gradients, based on execution of one or more instructions of the highly significant gradient extraction module 212. In an aspect, the CPU 202 may be further configured to perform the aforementioned determination of the set of highly significant gradients for vertical gradients based on a transpose of the edge image, based on execution of one or more instructions of the highly significant gradient extraction module 212.

At step 316, a gradient sign change may be determined by the CPU 202 for each pixel of the edge image. The gradient sign change may be based on the "grad_ang" determined in equation (4). At step 318, an edge direction change image may be determined by the CPU 202 by utilization of the gradient sign change for each pixel. Based on the determined gradient sign change image, the CPU 202 may be configured to analyze changes of gradient in the vicinity of edge pixels present in the HSE image. Such an analysis is performed to detect the oscillatory nature of change of gradient that may be indicative of ringing artifacts. Therefore, a change in gradient angle from a positive value and to a negative value, and/or vice versa, around a highly significant edge pixel is indicative of ringing artifacts in the vicinity of the highly significant edge pixel.

At step 320, ripples may be detected, by the CPU 202, around the determined set of highly significant edge pixels based on a determination of a ringing pixel count and a ringing strength aggregate. The determination of the ringing pixel count and the ringing strength aggregate may be based on execution of one or more instructions of the ringing statistics generation module 214.

Figure 4:
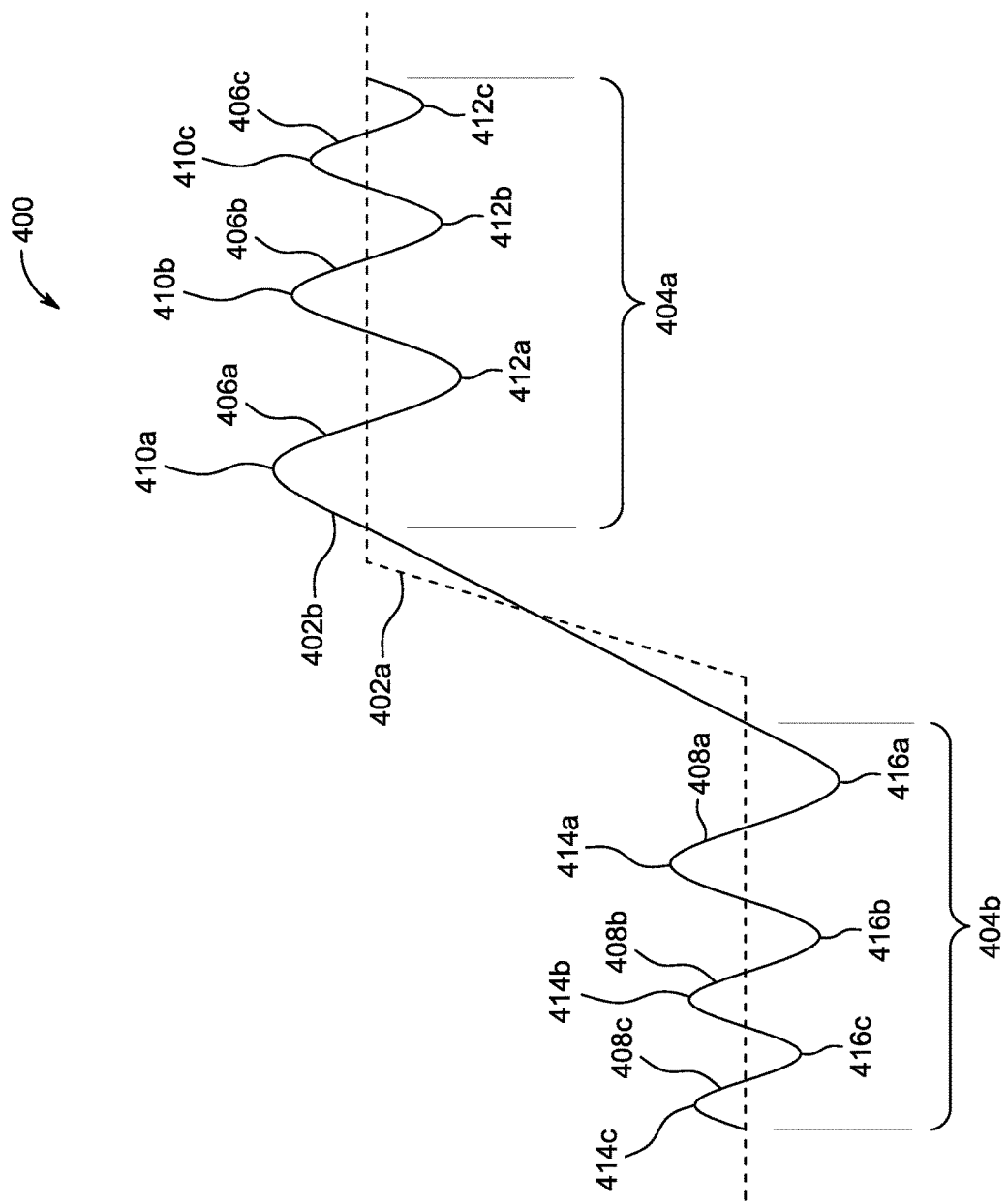
FIG. 4 is a diagram illustrating a method for determination of a ringing metric associated with a ringing artifact present in a video due to high quantization adopted during encoding of the image, according to an embodiment.

In an aspect, determination of the ringing pixel count and the ringing strength aggregate may be based on detection of ringing pixels located near the highly significant edge pixel. In an example embodiment, ideal gradient profile corresponding to the edge pixel is denoted by the line 402a, as depicted in FIG. 4. Further, the gradient profile corresponding to the edge pixel in case of high quantization is denoted by the line 402b. The depicted oscillations 404a and 404b correspond to the ringing artifact caused by the high quantization.

In an aspect, the CPU 202 may be configured to execute one or more instructions of the ringing statistics generation module 214 to detect a change of gradient direction in a predefined neighbourhood of the highly significant edge pixel. The detection of change of gradient direction may further be determined by utilization of the determined edge direction change image. In an aspect, the CPU 202 may be configured to detect change of gradient direction in a horizontal direction and a vertical direction. Such a determination in the horizontal and vertical directions may be based on transposing the edge image and performing the aforementioned steps to detect ripples.

In an aspect, the detection of the ripples, such as the ripples 406a to 406c and 408a to 408c, may be based on the determination of change in magnitude of the pixel values of pixels in edge image near one or more highly significant edge pixels.

The CPU 202 may be configured to detect one or more right overshoots, such as 410a. The one or more right overshoots may further correspond to the one or more right crests or one or more right troughs. The CPU 202 may be further configured to determine one or more right overshoots based on the change of gradient direction around the edge pixels in the HSE image. The CPU 202 may be configured to determine one or more crests, such as 410a to 410c, and one or more troughs, such as 412a to 412c, along the one or more right overshoots based on detection of a change in the gradient direction. Similarly, the CPU 202 may be configured to detect one or more left overshoots, such as 414a. The CPU 202 may be configured to determine one or more left overshoots based on the change of gradient direction around the edge pixels in the HSE image. The CPU 202 may be configured to determine one or more crests, such as 414a to 414b, and one or more troughs, such as 416a to 416c, along the one or more left overshoots based on detection of a change in the gradient direction. Further, the left overshoot is detected as an overshoot on the left side of the highly significant edge pixel. In an example embodiment, the aforementioned steps may be performed by the CPU 202 based on execution of one or more instructions of the ringing statistics generation module 214. A person of ordinary skill in the art will appreciate that the aforementioned steps may be performed by the CPU 202 based on one or more modules other than the ringing statistics generation module 214, which may be stored in the memory 204.

The CPU 202 may be configured to determine the ringing count and the ringing strength aggregate based on a set of intermediate variables that correspond to the detected crests and troughs associated with the ringing artifact. The set of intermediate variables may comprise a variable "temp1" that corresponds to an absolute value of a difference between a right crest 410b and a left crest 414a. The variable "temp2" that corresponds to the difference between right trough 412b and left trough 416a. The variable "temp3" corresponds to an absolute difference between a difference between a right crest 410b and a right trough 412b. The variable "temp4" corresponds to an absolute difference between a left crest

414a and a left trough 416a. The set of intermediate variables are expressed mathematically, in accordance with the equations (9) to (12):

$$temp1 = (filtered\_image\_array[x][crest\_index\_r-1] - filtered\_image\_array[x][crest\_index\_1]) \quad (9)$$

$$temp2 = (filtered\_image\_array[x][trough\_index\_r-1] - filtered\_image\_array[x][trough\_index\_1]) \quad (10)$$

$$temp3 = (filtered\_image\_array[x][crest\_index\_r-1] - filtered\_image\_array[x][trough\_index\_r-1]) \quad (11)$$

$$temp4 = (filtered\_image\_array[x][crest\_index\_1] - filtered\_image\_array[x][trough\_index\_1]) \quad (12)$$

where "filtered_image_array" corresponds to preprocessed input image based on median filtering. Further, the diagrammatic illustration of the aforementioned set of intermediate variables and equations has been provided in FIG. 4.

In an aspect, the CPU 202 may be configured to determine the ringing pixel count and ringing strength aggregate when one of a first set of conditions or a second set of conditions are true. The first set of conditions are in accordance with the equation (13):

$$((abs(temp1)>0) \text{ and } (abs(temp3)<abs((temp1))) \text{ and } (abs(temp4)<abs((temp))) \text{ and } (((gradient\ change<0) \text{ and } (temp4>0) \text{ and } (temp3<0)) \quad (13)$$

where, "gradient change" corresponds to a change in the gradient profile of the edge pixel in case of high quantization (denoted by the line 402b in FIG. 4). The change may correspond to a positive value or a negative value.

The second set of conditions are in accordance with the equation (14):

$$((abs(temp1)>0) \text{ and } (abs(temp3)<abs((temp1))) \text{ and } (abs(temp4)<abs((temp1))) \text{ and } (((gradient\ change>0) \text{ and } (temp4<0) \text{ and } (temp3>0)) \quad (14)$$

where, "temp1", "temp2", "temp3", and "temp4" correspond to the set of intermediate variables determined earlier. In an aspect, when either of the equation (13) or (14) is true, the CPU 202 may be configured to determine the ringing pixel count by incrementing the current value of the ringing pixel count. The ringing pixel count may be incremented whenever the result of equation (15) is true:

$$(1-(temp2/temp1))>EB\_RINGING\_DET\_THR1 \quad (15)$$

Further, the ringing strength aggregate is determined by the CPU 202 in accordance with the equation (16):

$$ringing\_agg = ringing\_agg + (temp2/temp1)) \quad (16)$$

where, "temp2" and "temp1" correspond to the variables from the set of intermediate variables (explained above), and "EB_RINGING_DET_THR1" is a programmable parameter that corresponds to the set of predefined constants that may be stored in the memory 204.

At step 322, a principal edge thickness aggregate may be determined by the CPU 202 based on execution of one or more instructions of the principal edge statistics generation module 218. Further, a count of principal edge segments may be determined by the CPU 202 based on a total length of the boundary segments associated with the ringing artifacts. In an aspect, the principal edge thickness aggregate may be determined based on determination of a edge width. The value of the edge width is incremented when a pixel is encountered in the PE image (represented by "boundary_image_array"), such that the value of the pixel is greater than a programmable threshold. Further, the value of principal edge thickness aggregate is updated with the value of the determined edge width, when the value of edge width is greater or equal to a programmable threshold. This aforementioned condition is expressed in accordance with equation (17) and (18):

$$\text{If, thickness\_count} \geq \text{BOUNDARY\_THICKNESS\_THR\_E} \quad (17)$$

$$boundary\_h\_thickness\_agg = boundary\_h\_thickness\_agg + thickness\_count \quad (18)$$

where, "thickness_count" corresponds to the edge width, "BOUNDARY_THICKNESS_THR_E" is a programmable threshold that corresponds to the set of predefined constants that may be stored in the memory 204, and "boundary_h_thickness_agg" corresponds to the principal edge thickness aggregate.

In another aspect, the count of principal edge segments may be incremented when a pixel is encountered in the PE image, such that the value of the pixel is less than or equal to a programmable threshold and the value of a pixel preceding the pixel is greater than a programmable threshold. This is expressed in accordance with equations (19) and (20):

$$\text{If boundary\_image\_array}[x][y-1]>0) \text{ and } (boundary\_image\_array[x][y] \leq 0)) \quad (19)$$

$$boundary\_h\_seg\_count = boundary\_h\_seg\_count + 1 \quad (20)$$

where, "boundary_h_seg_count" corresponds to the count of principal edge segments. In an aspect, the determination of the principal edge thickness aggregate, edge width, and the count of principal edge segments may be based on the execution of one or more instructions of the principal edge statistics generation module 218.

At step 324, a ringing metric may be determined by the CPU 202, based on the ringing pixel count, the ringing strength aggregate, the principal edge thickness aggregate, and the count of principal edge segments. The determination of the ringing metric may be based on the execution of one or more instructions of the ringing confidence generation module 220.

In an aspect, a normalized ringing strength aggregate may be determined by the CPU 202 based on the determined ringing strength aggregate and the ringing count. This may be determined in accordance with the equation (21):

$$norm\_ringing\_agg = ringing\_agg / ringing\_count \quad (21)$$

where, "norm_ringing_agg" corresponds to the normalized ringing strength aggregate may be stored in the memory 204.

In an aspect, a normalized principal edge thickness aggregate may be determined by the CPU 202 based on the principal edge thickness aggregate and the count of principal edge segments. This may be determined in accordance with the equation (22):

$$norm\_boundary\_h\_thickness\_agg = boundary\_h\_thickness\_agg / boundary\_h\_seg\_count \quad (22)$$

where, "norm_boundary_h_thickness_agg" corresponds to the normalized principal edge thickness aggregate that may be stored in the memory 204.

In an aspect, a first intermediate exponent may be determined based on the determined normalized ringing strength aggregate and the normalized principal edge thickness aggregate, in accordance with equation (23):

$$expn1 = EB\_K2\_R * (norm\_ringing\_agg * norm\_boundary\_h\_thickness\_agg)^{EB\_K3\_R} \quad (23)$$

where, "expn1" corresponds to the first intermediate exponent, "EB_K2_R" and "EB_K3_R" are programmable constants that correspond to the set of predefined constants that may be stored in the memory 204.

Similarly, a second intermediate exponent may be determined based on the determined normalized principal edge thickness aggregate, in accordance with equation (24):

$$\text{expn2}=\text{EB\_K6\_R}*(\text{norm\_boundary\_h\_thickness\_agg})^{EB\_K5\_R} \quad (24)$$

where, "expn2" corresponds to the second intermediate exponent, "EB_K5_R" and "EB_K6_R" are programmable constants that correspond to the set of predefined constants that may be stored in the memory 204. In an aspect, the ringing metric may be determined by the CPU 202 based on the determined first intermediate exponent, the second intermediate exponent, and the determined ringing count, in accordance with the equation (25):

$$\text{ringing\_confidence}=(1-e^{expn1})*(1-e^{(EB\_K4\_R*ringing\_count*ringing\_count)})*(e^{expn2}) \quad (25)$$

where, "ringing_confidence" corresponds to ringing metric, and "EB_K4_R" is a programmable constant that corresponds to the set of predefined constants that may be stored in the memory 204. In an aspect, the aforementioned ringing metric may correspond to a ringing metric associated with a horizontal or a vertical direction of the edge image. Therefore, the CPU 202 may be configured to determine a transpose of the edge image to determine the ringing metric associated with the direction for which the metric has not been determined, in accordance with the equations (8) to (25). The determined ringing metric associated with the horizontal direction may be denoted by "ringing_confidence (horizontal)". The determined ringing metric associated with the vertical direction may be denoted by "ringing_confidence (vertical)". In an aspect, an intermediate ringing metric may be determined by the CPU 202 based on the determined ringing metric for the horizontal and the vertical directions in accordance with the equation (26):

$$\text{ringing\_confidence\_int}=1-(1-\text{ringing\_confidence}(\text{horizontal}))*(1-\text{ringing\_confidence}(\text{vertical})) \quad (26)$$

where, "ringing_confidence_int" corresponds to intermediate ringing metric. Further, a normalized PE image aggregate may be determined by the CPU 202 based on a PE image aggregate, in accordance with the equation (27):

$$\text{norm\_boundary\_grad\_image\_agg}=\text{boundary\_grad\_image\_agg}/h/w \quad (27)$$

where, "norm_boundary_grad_image_agg" corresponds to normalized PE image aggregate, "boundary_grad_image_agg" corresponds to aggregate gradient values of each valid boundary pixel, "h" corresponds to a height of the PE image, and "w" corresponds to a width of the PE image. As in the case of the ringing metric, the normalized PE image aggregate may be determined, by the CPU 202, for the vertical and the horizontal directions of the PE image.

In an aspect, an average thickness of the principal edge may be determined by the CPU 202, based on a count of the principal edge pixels and the determined count of the count of principal edge segments, in accordance with the equation (28):

$$\text{av\_boundary\_thickness}=\text{boundary\_pixel\_count\_r}/\text{boundary\_h\_seg\_count} \quad (28)$$

where, "av_boundary_thickness" corresponds to the average thickness of the principal edge, "boundary_pixel_count_r" corresponds to a count of the principal edge pixels.

In an aspect, based on the determined normalized PE image aggregate for the vertical and the horizontal directions of the PE image, the CPU 202 may be configured to determine a total principal edge image aggregate, in accordance with equation (29):

$$\text{tot\_boundary\_grad\_agg}=\text{norm\_boundary\_grad\_image\_agg}(\text{horizontal})+\text{norm\_boundary\_grad\_image\_agg}(\text{vertical}) \quad (29)$$

where, "tot_boundary_grad_agg" corresponds to total principal edge image aggregate, "norm_boundary_grad_image_agg (horizontal)" corresponds to normalized principal edge image aggregate in the horizontal direction of the PE image, and "norm_boundary_grad_image_agg (vertical)" corresponds to normalized principal edge image aggregate in the vertical direction of the PE image.

In an aspect, an overall average principal edge thickness may be determined by the CPU 202, based on the determined average principal edge thickness in the horizontal and the vertical direction of the PE image, in accordance with the equation (30):

$$\text{overall\_av\_boundary\_thickness}=(\text{av\_boundary\_thickness}(\text{horizontal})+\text{av\_boundary\_thickness}(\text{vertical}))/2 \quad (30)$$

where, "overall_av_boundary_thickness" corresponds to overall average principal edge thickness, "av_boundary_thickness (horizontal)" corresponds to average principal edge thickness in the horizontal direction of the PE image, and "av_boundary_thickness (vertical)" corresponds to average principal edge thickness in the vertical direction of the PE image.

In an aspect, an overall ringing metric may be determined by the CPU 202 based on the determined intermediate ringing metric and the total principal edge image aggregate, in accordance with the equation (31):

$$\text{overall\_ringing\_confidence}=\text{ringing\_confidence\_int}*(1-\exp(EB\_K9*(\text{tot\_boundary\_grad\_agg}^{EB\_K10}))) \quad (31)$$

where, "overall_ringing_confidence" corresponds to overall ringing metric, "EB_K9" and "E_K10" are programmable constants that correspond to the set of predefined constants that may be stored in the memory 204.

At step 326, a grid periodicity and an offset of a block grid in the edge image may be determined by the CPU 202, based on execution of one or more instructions of the block grid analysis module 222. In an aspect, the periodicity and offset may be obtained for a horizontal and a vertical direction of the edge image based on processing of the horizontal and vertical gradients, respectively. A horizontal grid periodicity "h_block_period" may be determined based on a horizontal grid analysis and a vertical grid periodicity "v_block_period" may be determined based on a vertical grid analysis. The one or more instructions of the block grid analysis module 222 may be based on a block grid analysis technique disclosed by Qadri. M. T., Tan. K. T. & Ghanbari M, "Frequency Domain Blockiness and Blurriness Meter for Image Quality Assessment", International Journal of Image Processing (IJIP), Volume (5): Issue (3): 2011.

At step 328, strength of the grid that corresponds to a blockiness metric, "blockiness", may be determined by the CPU 202. In an example embodiment, the blockiness metric may be determined based on an autocorrelation analysis of the edge image in the frequency domain. In another example embodiment, the blockiness metric may be determined based on an autocorrelation analysis of the edge image in the spatial domain. The determination of the blockiness metric may be based on execution of one or more instructions of the block grid analysis module 222.

At step 330, a gradient histogram may be generated by the CPU 202 by use of the determined grid periodicity and the offset of the gradients. In an aspect, only the gradients that are off the grid are used for generation of the histogram. The generation of the gradient histogram may be based on a binning technique known in the art. Further, the gradient histogram may be generated based on execution of one or more instructions of the gradient histogram analysis module 224 by the CPU 202.

At step 332, a mean and a kurtosis (fourth moment) of the gradient histogram may be computed by the CPU 202. The computation of the mean "avg_grad" and kurtosis "kurt" may be based on execution of one or more instructions of the gradient histogram analysis module 224 by the CPU 202. In an aspect, the mean and kurtosis may be used for generation of a perceptual blurriness metric, by the perceptual blur confidence generation module 226. Such a perceptual blurriness metric may correspond to blurriness that may be perceived by a human eye.

At step 334, the perceptual blurriness metric may be determined based on the computed mean and kurtosis. The determination of the perceptual blurriness metric is based on the equation (32):

$$\text{combined\_blurriness\_confidence} = 0.5 * e^{(EB\_K2 * avg\_grad)} + 0.5 * (1 - e^{(EB\_K3 * abs(kurt))}) \quad (32)$$

where, "combined_blurriness_confidence" corresponds to the perceptual blurriness metric, "EB_K2" and "EB_K3" are programmable constants that correspond to the set of predefined constants that may be stored in the memory 204. In an aspect, the first portion of the equation (33) takes into account the average gradient of the edge image. The second portion of the equation (33) takes into account the kurtosis and is inversely related to the sharpness of the image as perceived by a human eye.

At step 336, it may be determined whether there is blockiness present in the edge image. In instances when blockiness is present in the edge image, the control passes to step 338. In instances when blockiness is not present in the edge image, the control passes to step 340.

At step 338, it may be determined whether the determined periodicity of the block grid in the edge image conforms to perceptual artifact perceived by a human eye. The determination may be performed in accordance with equation (33) where the periodicity of the block grid is compared with one or more empirically determined constants:

$$h\_block\_period * v\_block\_period \geq CONSTANT\_1 \quad (33)$$

where, "h_block_period" corresponds to a horizontal grid periodicity, "v_block_period" corresponds to a vertical grid periodicity, "CONSTANT_1" is an empirically determined constant that corresponds to the set of predefined constants that may be stored in the memory 204. In instances when determined periodicity of the block grid in the edge image conforms to a perceptual artifact as perceived by a human, the control passes to step 344. In instances when determined periodicity of the block grid in the edge image does not conform to a perceptual artifact as perceived by a human, the control passes to step 342.

At step 340, the value of the intermediate variable "ftemp" may be updated with the determined overall ringing metric. At step 342, the blockiness in the edge image is ignored and updated to a value a programmable threshold. At step 344, the blockiness metric may be updated in accordance with the equation (34):

$$ftemp = (blockiness/CONSTANT\_2)^4 \quad (34)$$

where, "ftemp" corresponds to an intermediate variable, and "CONSTANT_2" is an empirically determined constant that corresponds to the set of predefined constants that may be stored in the memory 204. In an example embodiment, the value of the "CONSTANT_2" may be "100.00". The control passes to step 346.

At step 346, the determined mean and kurtosis may be compared with empirically determined constants that may be stored in the memory 204. The comparison with the empirically determined constants may be performed by the CPU 202, to determine whether the combined blurriness conforms to a perceptual blurriness artifact as perceived by a human. The comparison may be performed based on execution of one or more instruction of the Overall blur confidence generation module 228, in accordance with equation (35):

$$(avg\_grad \geq CONSTANT\_3) \text{ or } (kurt \leq CONSTANT\_4) \quad (35)$$

where, "avg_grad" corresponds to the determined mean, "kurt" corresponds to the determined kurtosis, and "CONSTANT_3" and "CONSTANT_4" are empirically determined constants that correspond to the set of predefined constants that may be stored in the memory 204. In an example embodiment, the value of the "CONSTANT_3" may be "45.00" and the value of the "CONSTANT_4" may be "35.00". In an aspect, when the result of aforementioned condition is true, the perceptual blurriness metric may be set to a programmable threshold by the CPU 202.

At step 348, a composite blurring metric may be determined by the CPU 202, based on the perceptual blurriness metric, and/or the blockiness metric or the overall ringing metric, in accordance with equation (36):

$$Overall\_blur\_metric = combined\_blurriness\_confidence * ftemp \quad (36)$$

where, "Overall_blur_metric" corresponds to the composite blurring metric. Further, the intermediate variable "ftemp" may correspond to the blockiness metric or the overall ringing metric. In an example embodiment, the steps 336 to 348 may be performed by the CPU 202 based on execution of one or more instructions of the Overall blur confidence generation module 228. A person of ordinary skill in the art will appreciate that the aforementioned steps 336 to 348 may be performed by execution of one or more instructions of one or more other modules stored in the memory 204. The control passes to end step 350.

FIG. 4 is a diagram illustrating a method for determination of a ringing metric associated with a ringing artifact present in a video due to high quantization adopted during encoding of the image, according to an embodiment.

With reference to FIG. 4, there is shown a diagram 400 comprising an ideal gradient profile corresponding to an edge pixel in the edge image. The ideal gradient profile is denoted by the line 402a. The FIG. 4 further depicts the ringing artifact that is denoted by the line 402b.

In an example embodiment, the ringing artifact may comprise oscillations 404a that may be present to the right of the edge pixel. Similarly, the ringing artifact may comprise oscillations 404b that may be present to the left of the edge pixel. Further, the oscillations 404a may comprise a plurality of ripples 406a, 406b, and/or 406c. The oscillations 404b may comprise a plurality of ripples 408a, 408b, and/or 408c. The ripple 406a may comprise a crest 410a and a trough 412a, ripple 406b may comprise a crest 410b and a trough 412b, and ripple 406c may comprise a crest 410c and a trough 412c. Similarly, the ripple 408a may comprise a crest 414a and a trough 416a, ripple 408b may comprise a crest 414b and a trough 416b, and ripple 408c may comprise a crest 414c and a trough 416c. The depicted elements of the FIG. 4 and their correspondence have been explained in detail in FIGS. 3a, 3b, 3c, and 3d.

In another example embodiment, a non-transient computer readable memory storing one or more instructions for causing one or more processors for determining blur in a video having at least one image, due to high quantization adopted during encoding of the image. The one or more processors upon executing the instructions may be configured to preprocess the image to filter out the noise; extract an edge image by extracting gradients of the preprocessed image; determine a gradient sign change for each pixel of the edge image; determine an edge direction change image by utilizing the gradient sign change for each pixel in the edge image; determine maximum absolute gradient magnitude for each row of the edge image based on the pixel values of each pixel in each row of the edge image; determine a Principal Edge (PE) image by determining a first set of absolute gradients for each row that are greater than a first predefined percentage of the maximum absolute gradient magnitude for that row; determine a Highly Significant Edge (HSE) Image by determining a second set of absolute gradients for each row that are greater than a threshold, the threshold being equal to the greater of either a programmable constant or a multiple of the first predefined percentage of the maximum absolute gradient magnitude. The one or more processors may further detect ripples around a set of edge pixels of the determined Highly Significant Edge (HSE) image for determining a ringing pixel count and a ringing strength aggregate by detecting change of gradient direction in a predefined neighbourhood of the highly significant edge pixel by utilizing the edge direction change image, the change of gradient direction is detected in a horizontal direction and a vertical direction; detecting one or more right overshoots, corresponding one or more right troughs, and corresponding one or more right crests; detecting one or more left overshoots, corresponding one or more left troughs, and corresponding one or more left crests; determining the aggregate of ringing pixel count by incrementing the current value of the ringing pixel count when one of a first set of conditions or a second set of conditions are true, the first set of conditions and a second set of conditions are based on at least a right crest, a right trough, a left crest and a left trough; determining the ringing strength aggregate by adding the difference between one and a ratio of the difference between corresponding right trough and left trough and the difference between corresponding right crest and left crest. The one or more processors may further determine a principal edge thickness aggregate based on thickness of each edge present in PE image; determine a count of principal edge segments by determining total number of edge segments present in the PE image; determine a ringing metric, based on the ringing pixel count, the ringing strength aggregate, the principal edge thickness aggregate and the count of principal edge segments; determine a grid periodicity and an offset in horizontal and vertical direction for the edge image; determine a blockiness metric based on the validation of a grid in the previous step; generate a gradient histogram by using the grid periodicity and the offset of the gradients that are off the grid; compute a mean and kurtosis of the gradient histogram; determine a perceptual blurriness metric based on the computed mean and kurtosis. The one or more processors may further determine a composite blurring metric based on the perceptual blurriness metric, the blockiness metric and the ringing metric.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for determining blur in a video having at least one image, due to high quantization adopted during encoding of the image, the method comprising the steps of:
preprocessing the image for filtering out the noise;
extracting an edge image by extracting gradients of the preprocessed image;
determining a grid periodicity and an offset in horizontal and vertical direction for the edge image;
determining a blockiness metric based on the validation of a grid in the previous step;
determining a ringing metric, based on,
    determining a gradient sign change for each pixel of the edge image;
    determining an edge direction change image by utilizing the gradient sign change for each pixel of the edge image;
    determining maximum absolute gradient magnitude for each row of the edge image based on the pixel values of each pixel in each row of the edge image;
    determining a Principal Edge (PE) image by determining a first set of absolute gradients for each row that are greater than a first predefined percentage of the maximum absolute gradient magnitude for that row;
    determining a Highly Significant Edge (HSE) Image by determining a second set of absolute gradients for each row that are greater than a threshold, the threshold being equal to the greater of either a programmable constant or a multiple of the first predefined percentage of the maximum absolute gradient magnitude;
    detecting ripples around a set of edge pixels of the determined Highly Significant Edge (HSE) image for determining a ringing pixel count and a ringing strength aggregate by, detecting change of gradient direction in a predefined neighbourhood of the each highly significant edge pixel by utilizing the edge direction change image, the change of gradient direction is detected in a horizontal direction and a vertical direction;

detecting one or more right overshoots, corresponding one or more right troughs, and corresponding one or more right crests;

detecting one or more left overshoots, corresponding one or more left troughs, and corresponding one or more left crests;

determining the aggregate of ringing pixel count by incrementing the current value of the ringing pixel count when one of a first set of conditions or a second set of conditions are true, the first set of conditions and a second set of conditions are based on at least a right crest, a right trough, a left crest and a left trough; and determining the ringing strength aggregate by adding difference between one and a ratio of the difference between corresponding right trough and left trough and the difference between corresponding right crest and left crest;

determining a principal edge thickness aggregate based on thickness of each edge present in PE image;

determining a count of principal edge segments by determining total number of edge segments present in the Principal Edge (PE) image image;

computing the ringing metric, based on the ringing pixel count, the ringing strength aggregate, the principal edge thickness aggregate and the count of principal edge segments;

generating a gradient histogram by using the grid periodicity and the offset of the gradients that are off the grid;

computing a mean and kurtosis of the gradient histogram;

determining a perceptual blurriness metric based on the computed mean and kurtosis; and determining a composite blurring metric based on,
the determined perceptual blurriness metric, the determined blockiness metric when the magnitude of the blockiness metric is greater than the predetermined threshold, or
the determined perceptual blurriness metric and the determined ringing metric when the magnitude of the blockiness metric is less than the predetermined threshold.

2. The method of claim 1, wherein preprocessing the image comprises of applying a median filter.

3. The method of claim 1, wherein extracting gradients of the image comprises processing the image by a plurality of gradient filter mask.

4. The method of claim 1, wherein detecting ripples comprises of:
determining one or more right overshoots based on the change of gradient direction around the edge pixels in the Highly Significant Edge (HSE) image;
determining one or more crests and one or more troughs along the one or more right overshoots by detecting change in gradient direction;
determining one or more left overshoots based on the change of gradient direction around the edge pixels in the Highly Significant Edge (HSE) image;
determining one or more crests and one or more troughs along the one or more left overshoots by detecting change in gradient direction; and detecting a ripple if one or more crests and one or more troughs exists around the edge pixels of the Highly Significant Edge (HSE) image.

5. The method of claim 4, wherein the one or more predefined directions is horizontal direction.

6. The method of claim 4, wherein the one or more predefined directions is vertical direction.

7. The method of claim 1, wherein the right overshoot is detected as an overshoot on the right side of a highly significant edge pixel and wherein the right crests and the right troughs are the corresponding crests and troughs.

8. The method of claim 1, wherein the left overshoot is detected as an overshoot on the left side of a highly significant edge pixel and wherein the left crests and the left troughs are the corresponding crests and troughs.

9. The method of claim 1, wherein the first set of conditions comprise:
an absolute value of a difference between a right crest and a left crest greater than a programmable threshold, and
an absolute difference between a difference between a right crest and a right trough less than the difference of the right crest and the left crest, and
an absolute difference between a left crest and a left trough less than the difference of the right crest and the left crest, and
the absolute difference between a left crest and a left trough greater than a programmable threshold, and
the absolute difference between a difference between a right crest and a right trough less than a programmable threshold, and
the determined gradient sign change is a negative value.

10. The method of claim 1, wherein the second set of conditions comprise:
an absolute value of a difference between a right crest and a left crest greater than a programmable threshold, and
an absolute difference between a difference between a right crest and a right trough less than the difference of the right crest and the left crest, and
an absolute difference between a left crest and a left trough less than the difference of the right crest and the left crest, and
the determined gradient sign change is a positive value, and
an absolute difference between a left crest and a left trough is less than a programmable threshold, and
an absolute difference between a difference between a right crest and a right trough is greater than a programmable threshold.

11. The method of claim 1, wherein determining the principal edge thickness aggregate comprises:
determining an edge width by incrementing the value of the edge width when,
a pixel is encountered such that the value of the pixel is greater than a programmable threshold, or
a pixel is encountered such that the value of the pixel is less than or equal to a programmable threshold and the value of a pixel preceding the pixel is greater than a programmable threshold; and
updating the principal edge thickness aggregate based on the determined edge width if the edge width is greater than or equal to an edge thickness threshold.

12. A system for determining blurring due to high quantization in an image, the system comprising of:
a gradient extraction unit for extracting an edge image of the image for determining a gradient magnitude and a gradient direction for each pixel of the image; and a processor configured for:
determining a grid periodicity and an offset in horizontal and vertical direction for the edge image;
determining a blockiness metric based on the validation of a grid in the previous step;
determining a ringing metric, when the determined magnitude of the blockiness metric is less than a predetermined threshold, based on,
  determining a gradient sign change for each pixel of the edge image;
  determining an edge direction change image by utilizing the gradient sign change for each pixel of the edge image;
  determining maximum absolute gradient magnitude for each row of the edge image based on the pixel values of each pixel in each row of the edge image;
  determining a Principal Edge (PE) image by determining a first set of absolute gradients for each row that are greater than a first predefined percentage of the maximum absolute gradient magnitude for that row;
  determining a set of Highly Significant Edge (HSE) image by determining a set of absolute gradients for each row that are greater than a threshold, the threshold being equal to the greater of either a programmable constant or a multiple of the first predefined percentage of the maximum absolute gradient magnitude;
  detecting ripples around a set of edge pixels of the determined Highly Significant Edge (HSE) image for determining a ringing pixel count and a ringing strength aggregate by,
    detecting change of gradient direction in a predefined neighbourhood of each highly significant edge pixel by utilizing the edge direction change image, the change of gradient direction is detected in a horizontal direction and a vertical direction;
    detecting one or more right overshoots, corresponding one or more right troughs, and corresponding one or more right crests;
    detecting one or more left overshoots, corresponding one or more left troughs, and corresponding one or more left crests;
    determining the aggregate of ringing pixel count by incrementing the current value of the ringing pixel count when one of a first set of conditions or a second set of conditions are true, the first set of conditions and a second set of conditions are based on at least a right crest, a right trough, a left crest and a left trough; and
    determining the ringing strength aggregate by adding the difference between one and a ratio of the difference between corresponding right trough and left trough and the difference between corresponding right crest and left crest;
  determining a principal edge thickness aggregate based on thickness of each edge present in PE image;
  determining a count of principal edge segments by determining total number of edge segments present in the Principal Edge (PE) image;
  computing the ringing metric, based on the ringing pixel count, the ringing strength aggregate, the principal edge thickness aggregate and the count of principal edge segments;
generating a gradient histogram by using the grid periodicity and the offset of the gradients that are off the grid;
computing a mean and kurtosis of the gradient histogram;
determining a perceptual blurriness metric based on the computed mean and kurtosis; and
determining a composite blurring metric based on,
  the determined perceptual blurriness metric, the determined ringing metric and the determined blockiness metric when the magnitude of the blockiness metric is greater than the predetermined threshold, or
  the determined perceptual blurriness metric and the determined ringing metric when the magnitude of the blockiness metric is less than the predetermined threshold.

13. The system of claim 10, further comprising a noise filter for preprocessing the image before extracting the edge image.

14. The system of claim 10, wherein the gradient extraction unit is selected from the group consisting of a Sobel filter, a First Order Difference gradient filter, and a Canny edge detector.

15. A non-transient computer-readable medium comprising instructions for causing a programmable processor for:
preprocessing the image for filtering out the noise;
extracting an edge image by extracting gradients of the preprocessed image;
determining a grid periodicity and an offset in horizontal and vertical direction for the edge image;
determining a blockiness metric based on the validation of a grid in the previous step;
determining a ringing metric, based on,
  determining a gradient sign change for each pixel of the edge image;
  determining an edge direction change image by utilizing the gradient sign change for each pixel of the edge image;
  determining maximum absolute gradient magnitude for each row of the edge image based on the pixel values of each pixel in each row of the edge image;
  determining a Principal Edge (PE) image by determining a first set of absolute gradients for each row that are greater than a first predefined percentage of the maximum absolute gradient magnitude for that row;
  determining a Highly Significant Edge (HSE) image by determining a second set of absolute gradients for each row that are greater than a threshold, the threshold being equal to the greater of either a programmable constant or a multiple of the first predefined percentage of the maximum absolute gradient magnitude;
  detecting ripples around a set of edge pixels of the determined Highly Significant Edge (HSE) image for determining a ringing pixel count and a ringing strength aggregate by,
    detecting change of gradient direction in a predefined neighbourhood of each highly significant edge pixel by utilizing the edge direction change image, the change of gradient direction is detected in a horizontal direction and a vertical direction;
    detecting one or more right overshoots, corresponding one or more right troughs, and corresponding one or more right crests;
    detecting one or more left overshoots, corresponding one or more left troughs, and corresponding one or more left crests;
    determining the aggregate of ringing pixel count by incrementing the current value of the ringing pixel count when one of a first set of conditions or a second set of conditions are true, the first set of conditions and a second set of conditions are based on at least a right crest, a right trough, a left crest and a left trough; and determining the ringing strength aggregate by adding the difference between one and a ratio of the difference between corresponding right trough and left trough and the difference between corresponding right crest and left crest;

determining a principal edge thickness aggregate based on thickness of each edge present in PE image;

determining a count of principal edge segments by determining total number of edge segments present in the Principal Edge (PE) image;

computing the ringing metric, based on the ringing pixel count, the ringing strength aggregate, the principal edge thickness aggregate and the count of principal edge segments;

generating a gradient histogram by using the grid periodicity and the offset of the gradients that are off the grid;

computing a mean and kurtosis of the gradient histogram;

determining a perceptual blurriness metric based on the computed mean and kurtosis; and determining a composite blurring metric based on,
the determined perceptual blurriness metric, the determined blockiness metric when the magnitude of the blockiness metric is greater than the predetermined threshold, or the determined perceptual blurriness metric and the determined ringing metric when the magnitude of the blockiness metric is less than the predetermined threshold.

* * * * *